(12) United States Patent
Corley et al.

(10) Patent No.: US 10,652,299 B2
(45) Date of Patent: *May 12, 2020

(54) CONTROLLING DYNAMIC MEDIA TRANSCODING

(71) Applicant: Amazon Technologies, Inc., Reno, NV (US)

(72) Inventors: Jonathan B. Corley, Seattle, WA (US); Tal Saraf, Seattle, WA (US); Bradley E. Marshall, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,617

(22) Filed: Nov. 28, 2016

(65) Prior Publication Data

US 2017/0078358 A1 Mar. 16, 2017

Related U.S. Application Data

(63) Continuation of application No. 13/465,975, filed on May 7, 2012, now Pat. No. 9,510,033.

(51) Int. Cl.
*H04L 29/06* (2006.01)
*H04N 21/258* (2011.01)
(Continued)

(52) U.S. Cl.
CPC .......... *H04L 65/607* (2013.01); *H04N 19/40* (2014.11); *H04N 21/233* (2013.01);
(Continued)

(58) Field of Classification Search
CPC ..... H04N 21/234381; H04N 21/23551; H04N 21/23561; H04N 21/23581;
(Continued)

(56) References Cited

U.S. PATENT DOCUMENTS 5,541,852 A 7/1996 Eyuboglu et al.
6,732,332 B1 5/2004 Borysewcz et al.
(Continued)

OTHER PUBLICATIONS

"Non Final Office Action dated Nov. 17, 2016" received in U.S. Appl. No. 14/801,784.
(Continued)

*Primary Examiner* — Hsiungfei Peng
*Assistant Examiner* — Adil Ocak
(74) *Attorney, Agent, or Firm* — Hogan Lovells US LLP

(57) ABSTRACT

A number of approaches for transcoding media is described, which allow various users to control one or more aspects of transcoding (e.g. bit rate, resolution) when delivering media content to a client device from a network edge server or other location. The client device is provided with an interface that allows the user to increase or decrease the resolution, bit rate or other settings of the media content. Upon receiving a request from the user, the system transcodes the media content in accordance with the request and dynamically delivers the transcoded media content to the user's device. The system also enables content publishers and network operators to impose restrictions (e.g. minimum and maximum values for various settings) on user control.

20 Claims, 6 Drawing Sheets

(51) Int. Cl.
  *H04N 21/235* (2011.01)
  *H04N 21/262* (2011.01)
  *H04N 21/234* (2011.01)
  *H04N 21/233* (2011.01)
  *H04N 21/238* (2011.01)
  *H04N 21/2343* (2011.01)
  *H04N 21/6587* (2011.01)
  *H04N 21/475* (2011.01)
  *H04N 21/431* (2011.01)
  *H04N 19/40* (2014.01)

(52) U.S. Cl.
  CPC ......... *H04N 21/234* (2013.01); *H04N 21/235* (2013.01); *H04N 21/238* (2013.01); *H04N 21/2343* (2013.01); *H04N 21/258* (2013.01); *H04N 21/262* (2013.01); *H04N 21/4312* (2013.01); *H04N 21/475* (2013.01); *H04N 21/6587* (2013.01)

(58) Field of Classification Search
  CPC ....... H04N 21/2381; H04N 21/238051; H04N 21/23871; H04N 21/262
  See application file for complete search history.

(56) References Cited

U.S. PATENT DOCUMENTS

| | | |
|---|---|---|
| 6,970,602 B1 | 11/2005 | Smith |
| 7,231,023 B1 | 6/2007 | Begaja |
| 7,761,900 B2 | 7/2010 | Crayford |
| 7,958,532 B2 | 6/2011 | Paul et al. |
| 8,634,705 B2 | 7/2014 | Yogeshwar et al. |
| 9,078,091 B2 | 7/2015 | Lehtiniemi et al. |
| 9,088,634 B1 | 7/2015 | Corley |
| 9,183,049 B1 | 11/2015 | Corley |
| 9,189,484 B1 | 11/2015 | Velummylum |
| 9,223,621 B1 | 12/2015 | Corley |
| 9,292,896 B1 | 3/2016 | Corley |
| 9,380,326 B1 | 6/2016 | Corley |
| 9,483,785 B1 | 11/2016 | Corley |
| 9,497,496 B1 | 11/2016 | Corley |
| 9,510,033 B1 | 11/2016 | Corley |
| 10,191,954 B1 | 1/2019 | Corley |
| 2002/0150247 A1 | 10/2002 | Linnartz et al. |
| 2002/0170035 A1 | 11/2002 | Casati et al. |
| 2006/0168630 A1 | 7/2006 | Davis |
| 2007/0106622 A1 | 5/2007 | Boomershine |
| 2007/0157260 A1 | 7/2007 | Walker |
| 2007/0162945 A1 | 7/2007 | Mills |
| 2007/0169113 A1 | 7/2007 | Moore |
| 2007/0174338 A1 | 7/2007 | Liggett |
| 2008/0034393 A1 | 2/2008 | Crayford |
| 2008/0081648 A1 | 4/2008 | Kang |
| 2008/0205510 A1 | 8/2008 | Komi et al. |
| 2008/0242280 A1* | 10/2008 | Shapiro ............ H04N 21/25891 455/414.3 |
| 2008/0301588 A1* | 12/2008 | Kumar ..................... H04N 7/24 715/841 |
| 2009/0043888 A1 | 2/2009 | Jackson |
| 2009/0083279 A1 | 3/2009 | Hasek |
| 2009/0171674 A1 | 7/2009 | Mitsumori |
| 2009/0172685 A1 | 7/2009 | Shavit |
| 2009/0254672 A1 | 10/2009 | Zhang |
| 2009/0276266 A1 | 11/2009 | Nishiyama |
| 2009/0276716 A1 | 11/2009 | Chua |
| 2010/0017516 A1 | 1/2010 | Sparrell et al. |
| 2010/0054148 A1 | 3/2010 | Murakami et al. |
| 2010/0076805 A1 | 3/2010 | Batsakis et al. |
| 2010/0088505 A1 | 4/2010 | Coppola et al. |
| 2010/0131674 A1 | 5/2010 | Vecchio |
| 2010/0195540 A1 | 8/2010 | Kerr et al. |
| 2010/0199299 A1 | 8/2010 | Chang et al. |
| 2010/0205616 A1 | 8/2010 | Lai et al. |
| 2010/0250710 A1 | 9/2010 | Cadwell et al. |
| 2010/0281042 A1 | 11/2010 | Windes et al. |
| 2010/0309794 A1 | 12/2010 | Keynan et al. |
| 2010/0332262 A1 | 12/2010 | Horvitz et al. |
| 2011/0019870 A1 | 1/2011 | Ballocca et al. |
| 2011/0082982 A1 | 4/2011 | Harvell et al. |
| 2011/0088076 A1 | 4/2011 | Li et al. |
| 2011/0153628 A1 | 6/2011 | Basu et al. |
| 2011/0197221 A1 | 8/2011 | Rouse et al. |
| 2011/0209162 A1 | 8/2011 | Machiraju et al. |
| 2011/0310995 A1 | 12/2011 | Dougherty |
| 2011/0313982 A1 | 12/2011 | Kranendonk et al. |
| 2011/0314093 A1 | 12/2011 | Sheu et al. |
| 2012/0030341 A1 | 2/2012 | Jensen |
| 2012/0030376 A1 | 2/2012 | Leemus |
| 2012/0072542 A1 | 3/2012 | McGowan |
| 2012/0079054 A1 | 3/2012 | Moroney |
| 2012/0089687 A1 | 4/2012 | Katz |
| 2012/0102154 A1 | 4/2012 | Huang et al. |
| 2012/0131591 A1 | 5/2012 | Moorthi |
| 2012/0158645 A1 | 6/2012 | Shafiee et al. |
| 2012/0159494 A1 | 6/2012 | Shafiee et al. |
| 2012/0159503 A1 | 6/2012 | Shafiee et al. |
| 2012/0192239 A1* | 7/2012 | Harwell ............ H04N 21/2343 725/109 |
| 2012/0209942 A1 | 8/2012 | Zehavi et al. |
| 2012/0236201 A1 | 9/2012 | Larsen et al. |
| 2012/0254456 A1 | 10/2012 | Visharam et al. |
| 2012/0265847 A1 | 10/2012 | Swenson et al. |
| 2012/0278441 A1 | 11/2012 | Li et al. |
| 2012/0331089 A1 | 12/2012 | Vonog |
| 2013/0019311 A1 | 1/2013 | Swildens |
| 2013/0036117 A1 | 2/2013 | Fisher |
| 2013/0054827 A1 | 2/2013 | Feher et al. |
| 2013/0243075 A1 | 9/2013 | Dalela |
| 2014/0115592 A1 | 4/2014 | Frean |
| 2014/0258441 A1 | 9/2014 | L'Heureux |
| 2014/0359092 A1 | 12/2014 | Middleton |

OTHER PUBLICATIONS

"Final Office Action dated Mar. 21, 2016" received in U.S. Appl. No. 13/465,944.
"Notice of Allowance dated Jul. 20, 2016" received in U.S. Appl. No. 13/465,944.
"Final Office Action dated Jun. 3, 2016" received in U.S. Appl. No. 13/465,960.
"Non Final Office Action dated Jul. 14, 2016" received in U.S. Appl. No. 14/801,784.
"Final Office Action dated Aug. 8, 2016" received in U.S. Appl. No. 13/465,987.
"Notice of Allowance dated Mar. 8, 2016" received in U.S. Appl. No. 13/465,992.
"Notice of Allowance dated Jul. 20, 2016" received in U.S. Appl. No. 13/466,002.
"Non Final Office Action dated Feb. 4, 2014" received in U.S. Appl. No. 13/465,975.
"Final Office Action dated Sep. 11, 2014" received in U.S. Appl. No. 13/465,975.
"Non Final Office Action dated Jan. 16, 2015" received in U.S. Appl. No. 13/465,975.
"Final Office Action dated Sep. 8, 2015" received in U.S. Appl. No. 13/465,975.
"Notice of Allowance dated Aug. 3, 2016" received in U.S. Appl. No. 13/465,975.
"Non Final Office Action dated Jul. 31, 2015" received in U.S. Appl. No. 13/465,944.
"Non Final Office Action dated Nov. 22, 2015" received in U.S. Appl. No. 13/465,960.
"Final Office Action dated Aug. 27, 2015" received in U.S. Appl. No. 13/465,978.
"Non Final Office Action dated Jul. 17, 2015" received in U.S. Appl. No. 13/465,987.
"Non Final Office Action dated Jul. 14, 2015" received in U.S. Appl. No. 13/465,992.

(56) References Cited

OTHER PUBLICATIONS

"Software." The Authoritative Dictionary of IEEE Standard Terms. $7^{th}$ ed. 2000, pp. 1067.
"Non Final Office Action dated Jun. 5, 2015" received in U.S. Appl. No. 14/682,004.
"Non Final Office Action dated Nov. 20, 2015" received in U.S. Appl. No. 14/682,004.
"Non Final Office Action dated Feb. 9, 2016" received in U.S. Appl. No. 13/466,002.
U.S. Appl. No. 61/562,377.
U.S. Appl. No. 61/527,485.
Newton, "API", Newton's Telecom Dictionary, $18^{th}$ Ed., Feb. 2002, 1 page.
"Non Final Office Action dated Sep. 24, 2014" received in U.S. Appl. No. 13/465,944.
"Final Office Action dated Jul. 3, 2014" received in U.S. Appl. No. 13/465,978.
"Non Final Office Action dated Jul. 29, 2014" received in U.S. Appl. No. 13/465,992.
"Non Final Office Action dated Oct. 21, 2014" received in U.S. Appl. No. 13/465,997.
"Non Final Office Action dated Sep. 23, 2014" received in U.S. Appl. No. 13/466,002.
"Non Final Office Action dated Feb. 4, 2014" received in U.S. Appl. No. 13/465,978.
"Non Final Office Action dated Apr. 2, 2013" received in U.S. Appl. No. 13/465,987.
"Final Office Action dated Oct. 24, 2013" received in U.S. Appl. No. 13/465,987.
"Non Final Office Action dated May 1, 2014" received in U.S. Appl. No. 13/465,997.
"Non Final Office Action dated Jan. 3, 2013" received in U.S. Appl. No. 13/466,002.
"Final Office Action dated Jul. 19, 2013" received in U.S. Appl. No. 13/466,002.
Final Office Action Issued in U.S. Appl. No. 14/801,784 dated Jun. 16, 2017.
Non-Final Office Action Issued in U.S. Appl. No. 14/801,784 dated Mar. 26, 2018.
Non-Final Office Action issued in U.S. Appl. No. 13/465,960 dated Oct. 26, 2017.
Notice of Allowance issued in U.S. Appl. No. 13/465,978 dated Mar. 27, 2017.
Non-Final Rejection issued in U.S. Appl. No. 13/465,987 dated Aug. 8, 2017.
Final Rejection issued in U.S. Appl. No. 13/465,987 dated Dec. 27, 2017.
Final Office Action issued in U.S. Appl. No. 14/801,784 dated Sep. 5, 2018.
Non-Final Office Action issued in U.S. Appl. No. 14/801,784 dated Feb. 26, 2019.
Wiley online book "Cloud Computing: Principles and Paradigms" (published Jan. 3, 2011) to Buyya et al. ("Buyya") (Year: 2011).
Final Office Action issued in U.S. Appl. No. 13/465,960 dated Jun. 18, 2018.
Non-Final Office Action issued in U.S. Appl. No. 15/627,137 dated Nov. 28, 2018.
Final Office Action issued in U.S. Appl. No. 15/627,137 dated Mar. 18, 2019.
Notice of Allowance issued in U.S. Appl. No. 13/465,987 dated Sep. 20, 2018.
Non-Final Office Action issued in U.S. Appl. No. 15/339,460 dated May 3, 2019.
Anonymous, Altair Introduces Advanced Scheduling Features with PBS Professional(TM) 9.2: Eligible time, tunable formula and standing reservations help customers achieve higher ROI, May 20 2008, PR Newswire (Year: 2008).
Non-Final Office Action issued in U.S. Appl. No. 13/465,960 dated Sep. 18, 2019.
Non-Final Office Action issued in U.S. Appl. No. 15/627,137 dated Jul. 25, 2019.
Notice of Allowance issued in U.S. Appl. No. 15/339,460 dated Sep. 18, 2019.
Examiner's Answer issued in U.S. Appl. No. 14/801,784 dated Nov. 22, 2019.

\* cited by examiner

CONTROLLING DYNAMIC MEDIA TRANSCODING

CROSS-REFERENCES TO RELATED APPLICATIONS

This application is a continuation of allowed U.S. application Ser. No. 13/465,975, entitled "CONTROLLING DYNAMIC MEDIA TRANSCODING," filed May 7, 2012; of which the full disclosure of this application is incorporated herein by reference for all purposes.

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Transcoding is the decoding and recoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported.

BRIEF DESCRIPTION OF THE DRAWINGS

Various embodiments in accordance with the present disclosure will be described with reference to the drawings, in which.

DETAILED DESCRIPTION

Figure 1:
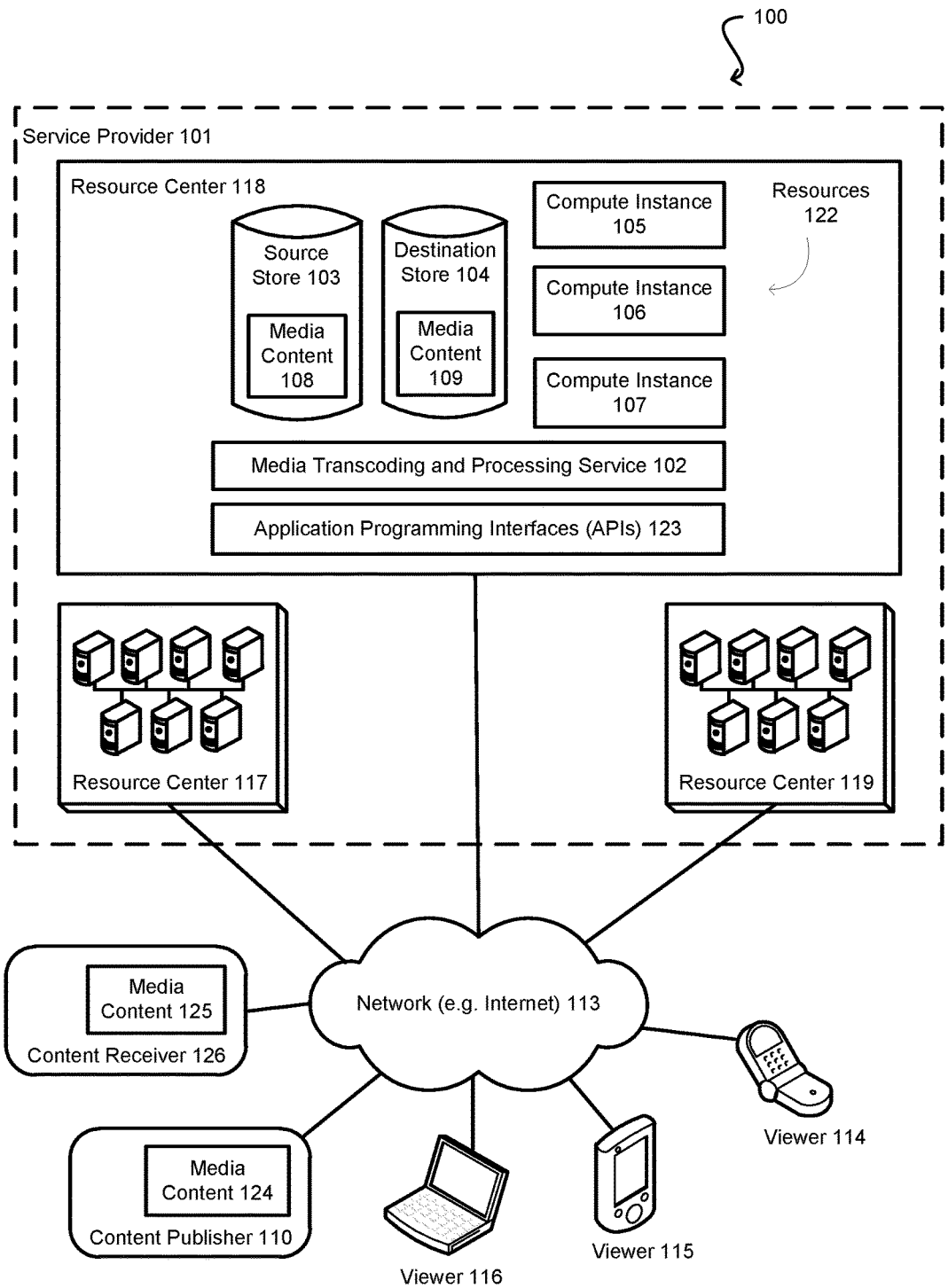
FIG. 1 is a general illustration of an environment in which watermarking and transcoding can be implemented, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for processing content. In particular, the various embodiments provide approaches for enabling a user (e.g. end user, content publisher, network operator) to control one or more aspects of transcoding (e.g. bit rate, resolution) when providing content, such as media content, to a device from a network edge server or other such location.

In accordance with various embodiments, a transcoding system or service is described that can dynamically transcode media content into various formats at the time of delivering the media content to client devices from the network edge (e.g. content delivery network point-of-presence) or other location. The service can receive a request to access media content from a client device (e.g. mobile phone, tablet computer). In accordance with an embodiment, the client device may include an interface to allow the user of the device to increase or decrease one or more transcoding settings (e.g. bit rate, resolution) of the media content being delivered to the device.

In accordance with an embodiment, the media content can be stored at a network edge server in a particular source encoding format. Upon receiving the request, the system can transcode the media content from the source format into one or more different formats that may be needed to render the media on the requesting device. In addition, the service may check the parameters associated with the request which indicate the bit rate or resolution that were specified as preferences for delivering the content to the user. When transcoding the content, the system can dynamically configure the settings for the encoder/transcoder based at least in part on the parameters specified in the request in order to transcode and deliver the media in accordance with the specified bit rate and resolution.

In accordance with an embodiment, the transcoding service can further receive instructions from the content publisher (e.g. content creator, owner) regarding the transcoding settings. For example, the content publisher may wish to restrict the resolution and bit rate of transcoding its content in order to prevent it from being degraded too much. In this case, the content publisher may provide instructions to the transcoding service, wherein the instructions set a minimum bit rate and minimum resolution of video for content being delivered on behalf of the content publisher.

In accordance with an embodiment, the transcoding service can further receive instructions from the network operator that operates the network over which the media content is being delivered to the client device. In many instances, the network operator may wish to impose some restrictions on the amount of data being transmitted over its network in order to prevent or reduce traffic congestion, latency and other potential issues. For example, the network operator may provide instructions to the transcoding service that set a maximum resolution or bit rate for content being delivered. In some cases, the maximums may vary depending on time of day or during special events when the network is most crowded.

In this manner, the service provides control to the user over costs and quality of service. For example, a user may be offered a slider mechanism (e.g. graphical touch screen slider interface) that lets the user decide at what quality the media should be delivered to the user. This can allow the user to control costs if they are on a fixed bandwidth cellular plan for example. Alternatively, it enables the user to manually tune and adjust the quality of service that the user is getting. Because the service can transcode the media content being delivered to the user on-the-fly, the service can make granular increments and decrements to the bit rate and resolution to make it highly customized for the user.

In addition, a content publisher (e.g. content creator, distributor, owner) may want to provide controls over what the user is allowed to do with the content. For example, the content owner may want to ensure that the user is not allowed to completely degrade the quality of the media by tuning the resolution or bit rate extremely low such that the user has a really bad impression of the content.

It should be noted that although this disclosure frequently refers to the bit rate and resolution settings of media content, the various embodiments described herein are not limited to these specific settings. In various alternative embodiments, any transcoding or encoding setting can be controlled within the scope of the present disclosure, including but not limited to thumbnail settings, audio settings, aspect, scaling, frame rate, color, depth, video/audio quality and the like.

FIG. 1 is a general illustration of an environment 100 in which watermarking and transcoding can be implemented, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the transcoding service. As one option, the pricing of transcoding service could be based on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

Figure 2:
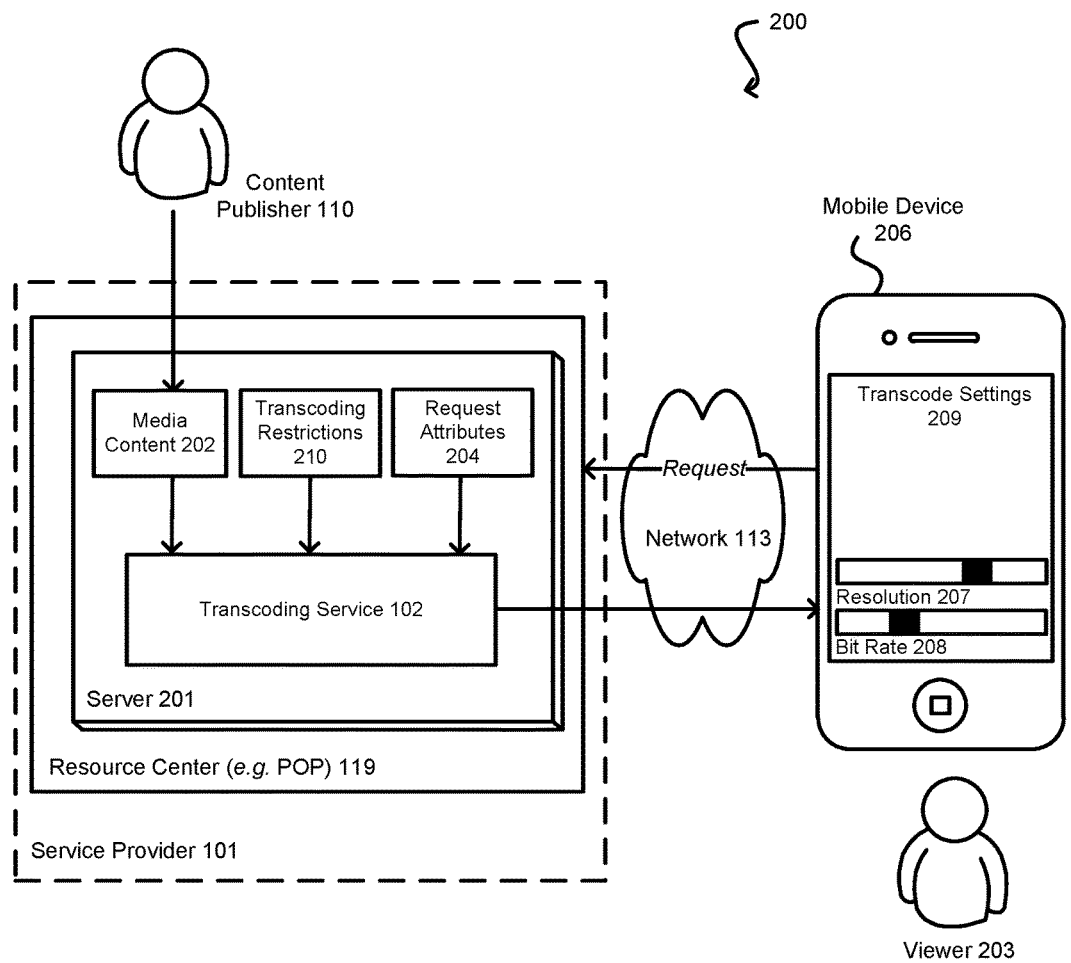
FIG. 2 is an example of an environment where the transcoding service enables a user to control the dynamic transcoding of media content, in accordance with various embodiments.

FIG. 2 is an example of an environment 200 where the transcoding service enables a user to control the dynamic transcoding of media content, in accordance with various embodiments. It should be understood that reference numbers for like components may be carried over between figures for purposes of explanation, but this should not be interpreted as limiting the scope of the various embodiments.

In accordance with the illustrated embodiment, a viewer 203 using a mobile device 206 (or other such computing device) may request content, such as media content, from the service provider 101. For example, a user using a browser of the mobile device 206 may request to view a particular video provided by content publisher 110. In accordance with an embodiment, the requested media content 202 (e.g. video file) is stored on a server 201 in a resource center 119, such as the content delivery network (CDN) point-of-presence (POP). The media content may have been provided directly by the content publisher 110 or retrieved from another location specified by the publisher.

In accordance with an embodiment, the media content 202 arrives to the server 201 in a particular encoding format (e.g. source format). In many instances, the media content 202 will need to be transcoded into one or more different encoding formats in order to be rendered on the variety of different requesting client devices, operating systems and applications. The transcoding service can dynamically transcode the media content 202 upon receiving a request from a client device into a format that is appropriate for displaying the media on that specific device. In one embodiment, the transcoding service 102 can inspect the information associated with the request and determine a particular encoder/transcoder and the settings to use to transcode the media content.

In accordance with an embodiment, a viewer on the mobile device 206 requesting the media content can specify one or more parameters to use when transcoding the media for the device. In one embodiment, the viewer 203 can use the transcode settings 209 on the device, such as a slider mechanism to control the bit rate 208 and resolution 207 of the media (e.g. video) being transcoded on the server 201. Alternatively, an application or operating system of the device 206 may control the bit rate or resolution on behalf of the user. For example, a user may wish to control the bit rate and resolution of the content according to their particular cellular data plan and charges. In many cases, users are being charged per megabyte of data downloaded per month and they may desire to be able to consume as much data in as high of a quality as can be done within the limits of their plan. In that case, the user may either manually control the bit rate and resolution of the media content they are watching, or alternatively, the browser, application or operating system of the device may perform this function on behalf of the user automatically.

In accordance with an embodiment, when the viewer modifies the transcode settings 209, the information about the settings may be transmitted along with the request to the service provider 101. In one embodiment, once the service provider receives the request, the transcoding service 102 can initiate the transcoding job for the media content 202. The transcoding service 102 can inspect the attributes 204 of the request and determine which transcoding settings to use to transcode the media content. For example, based at least in part on the information in the request, the transcoding service 102 may determine which encoder to use, as well as the bit rate and resolution settings for performing the transcoding.

In accordance with an embodiment, the transcoding service 102 may also inspect any transcoding restrictions 210 that may be imposed on the media content 202. For example, the restrictions may allow only a specific range of resolution and bit rate to use for transcoding. In that case, the transcoding service may first verify that the parameters of the request are within the allowed limits before starting the transcodes. The transcoding limits and restrictions are described in further detail with reference to FIG. 3 and the associated description of this disclosure.

In accordance with an embodiment, upon completing the transcoding, the transcoded media content can be delivered to the requesting device 206. In at least one embodiment, the bits of transcoded media content may be streamed to the device while the remaining bits of the media are being transcoded. In other embodiments, the transcoding service may wait until all of the content has been transcoded or transcode the media before receiving any requests from the client devices.

Figure 3:
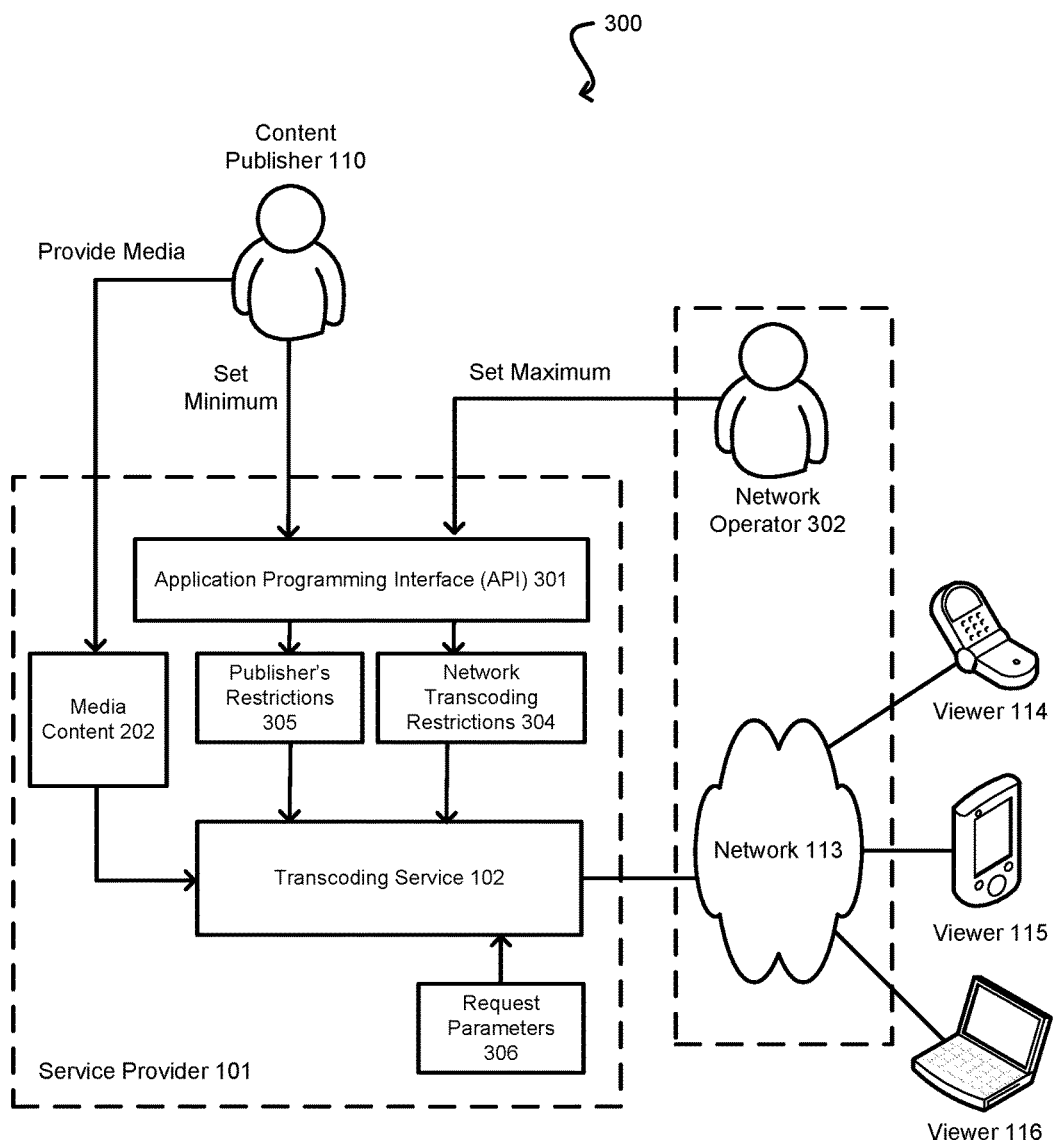
FIG. 3 is an example of an environment where the transcoding service enables content publishers and network operators to restrict user control of dynamic media transcoding, in accordance with various embodiments.

FIG. 3 is an example of an environment 300 where the transcoding service enables content publishers and network operators to restrict user control of dynamic media transcoding, in accordance with various embodiments.

In accordance with the illustrated embodiment, the service provider 101 can provide an application programming interface (API) 301 or other mechanism for enabling content publishers (e.g. content creators, distributors, owners) and network operators to restrict the transcoding parameters that may be specified by various viewers (114, 115, 116). As previously described, when the transcoding service 102 receives requests from the various viewer devices, it may perform on-the-fly transcoding of the media content 202 that it has received from the content publisher 110. The various devices (114, 115, 116) may further specify the transcoding parameters (e.g. bit rate, resolution, etc.) for media delivered to them.

In accordance with an embodiment, in addition to providing the media content 202, the content publisher 110 may also specify a set of restrictions 305 when providing the media content 202 to the service provider 101. For example, the content publisher 110 may provide instructions setting a minimum resolution and bit rate for media content 202. The set minimum restricts the ability of various viewer devices from downgrading the resolution and bit rate below the threshold limit. The content publisher may also specify various other restrictions, such as thumbnail settings, audio settings, aspect, scaling, frame rate, video/audio quality and the like.

In accordance with an embodiment, the service may also allow the network operator 302 to specify a set of network transcoding restrictions 304. The network operator 302 may be any entity that owns and operates network 113, such as a wireless carrier, mobile virtual network operator (MVNO), cellular company, internet service provider or the like. In various embodiments, the network operator may specify the restrictions 304 such as the maximum bit rate and resolution of the transcoding for media content delivered using its network 113. These restrictions may be based on the network operator's knowledge of the available bandwidth, current traffic, time of day or any other factors known to the operator 302. For example, the network operator 302 may set a maximum bit rate and resolution for media delivered over its network 113. This can enable the operator to ensure that content can be delivered to all of the users connecting to the network 113. In some conventional approaches, network operators employ priorities when performing quality of service (QOS) traffic management in order to ensure that the content would be delivered during periods of high demand. For example, some network operators (e.g. smaller operators) may oversubscribe a number of users for the available bandwidth of digital data that they can provide. To deal with this, some network operators may apply priorities to some types of content (preferred customer content) in order to ensure that this content is delivered through the network in a satisfactory manner during periods of high congestion. In these cases, content of lesser priority may be delayed or not delivered when bandwidth is constrained. In various embodiments, by controlling the bit rate, resolution and various other transcoding parameters, the network operator 302 is provided with the ability to manage all content delivery across all customers by reducing the maximum limit that the content can be delivered in. This can ensure that all of the operator's customers are able to get the content by reducing the amount of data being transmitted through the network. In various embodiments, the settings (e.g. resolution, bit rate, etc.) enable the service provider to affect the overall QOS of the service instead of merely the individual connection. For example, by adjusting the settings, the network operator can adjust the QOS for its entire network instead of only the individual user that is requesting content.

In accordance with various embodiments, when the transcoding service 102 receives a request from a viewer device, the service can obtain the requested bit rate and resolution parameters 306 from the request. The service provider can enforce the publisher's restrictions 305 and the network operator's restrictions 304 on the request and ensure that the requested bit rate and resolution do not exceed the limits specified in the restrictions (304, 305). In one embodiment, the service provider may verify the parameters at the time of receiving the request. In an alternative embodiment, the service provider may restrict the interface exposed to the user on the viewer device (e.g. adjust the slider mechanism) to prevent the user from selecting too high or too low of a bit rate or resolution. In this manner, the user is provided with control over how good of a quality of media they would like to receive, while still being subject to the restrictions and limits set by the content providers and network operators.

Once the service 102 determines the valid settings to apply, the service transcodes the media content and delivers the transcoded content to the viewer devices (114, 115, 116) in response to the request. In some embodiments, the user is enabled to adjust the bit rate and resolution settings during the streaming of media content to the device, at which point, the transcoding service would modify and dynamically reconfigure the transcoding job in accordance with the user's new settings.

Figure 4:
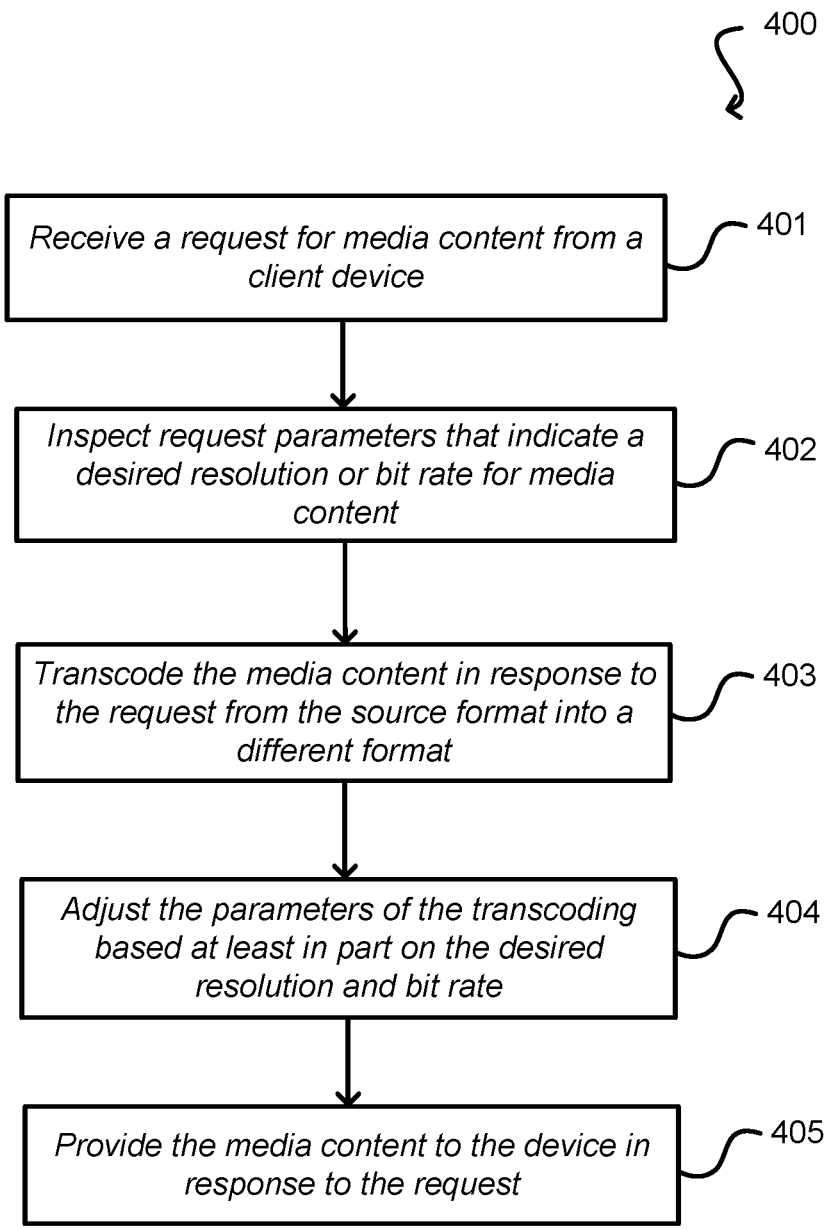
FIG. 4 illustrates an example process for enabling a user to control dynamic media transcoding, in accordance with various embodiments.

FIG. 4 illustrates an example process 400 for enabling a user to control dynamic media transcoding, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in operation 401, the transcoding service receives a request for media content from a client device, such as a mobile phone, tablet computing device, personal computer (PC), or the like. For example, the request may be received via HTTP by a user selecting to download and view a video provided by a content publisher. In accordance with an embodiment, the client device can include an interface to allow the user to specify various parameters associated with the media content, such as bit rate, resolution and the like.

In operation 402, the service inspects the information contained in the request and determines the bit rate and resolution that were specified on the client device. These settings may have been set by the user manually or may be automatically set by the browser, application or operating system on the client device on behalf of the user. In one embodiment, the settings may be based at least in part on the cellular data plan that the user is subscribed to with the network operator.

In operation 403, the service transcodes the media content in response to the request from a source format into one or more different formats. Some examples of the various media encoding formats may include but are not limited to H.264/MPEG-4 AVC, M-JPEG, MPEG-4, OGG-Theora, VP8-WebM, VC1 (SMPTE), as well as any other media formats and encodings that are known in the art.

In operation 404, when transcoding the content, the service adjusts the parameters of the transcoding based at least in part on the desired resolution and bit rate specified in the request. For example, if the user has specified low bit rate and resolution, the service may select an appropriate encoder and adjust the settings on the encoder in accordance with those parameters. In one embodiment, the service may verify that the specified parameters do not exceed the restrictions as previously described.

In operation 405, the service provides the transcoded media content to the device in response to the request. In at least one embodiment, the transcoded portions of the media content can be streamed to the device while the remaining portions are being transcoded on the servers of the service provider.

Figure 5:
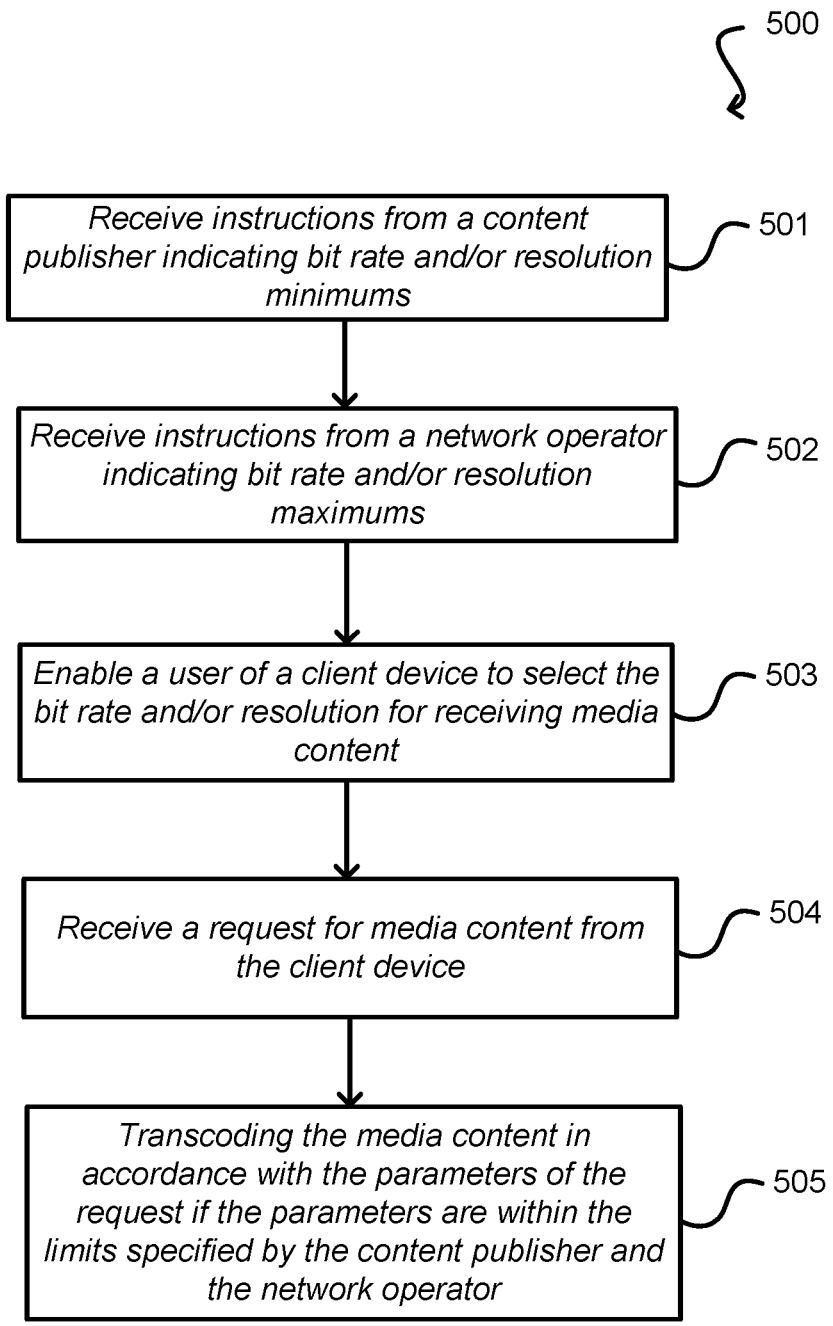
FIG. 5 illustrates an example of a process for enabling content publishers and network operators to restrict user control of the transcoding, in accordance with various embodiments.

FIG. 5 illustrates an example of a process 500 for enabling content publishers and network operators to restrict user control of the transcoding, in accordance with various embodiments.

In operation 501, the transcoding service receives instructions from a content publisher. The instructions can indicate the minimum requirements for the bit rate, resolution and any other setting that may be specified by the content publisher. In accordance with an embodiment, these restrictions are associated with the media content that is provided by this content publisher.

In operation 502, the service receives instructions from a network operator, indicating maximum requirements for the bit rate, resolution and/or other transcoding settings. In one embodiment, the restrictions may be associated with particular time-of-day or specific events, dates and the like. For example, the network operator may specify that during the business hours of 8:00 am until 6:00 pm, the maximum bit rate and resolution should be lower than from the hours of midnight until 4 am.

In operation 503, the service enables a user of a client device to select the bit rate and resolution that it would like to receive the media content in. For example, the user may use an interface of the client device (e.g. slider) to request to lower or increase the bit rate based at least in part on the wireless data plan associated with the user. In accordance with one embodiment, the interface exposed to the user may be restricted by the data restrictions specified by the content publisher and/or network operator.

In operation 504, the service receives the request for media from the client device. In accordance with one embodiment, the media may be stored in a source format that is not appropriate to be consumed on the client device.

In operation 505, the service transcodes the media content in accordance with the parameters of the request if those parameters are within the limits specified by the content publisher and network operator (e.g. in operations 501 and 502). As previously described, the verification of the parameters may be performed upon receiving the request, or transmitting the restriction information to the client device in advance so that the interface exposed to the user prevents the user from selecting any values outside of the limits imposed by the publisher or operator. Once the media content is transcoded in accordance with the parameters specified by the user, it can be provided (e.g. streamed) to the client device.

Figure 6:
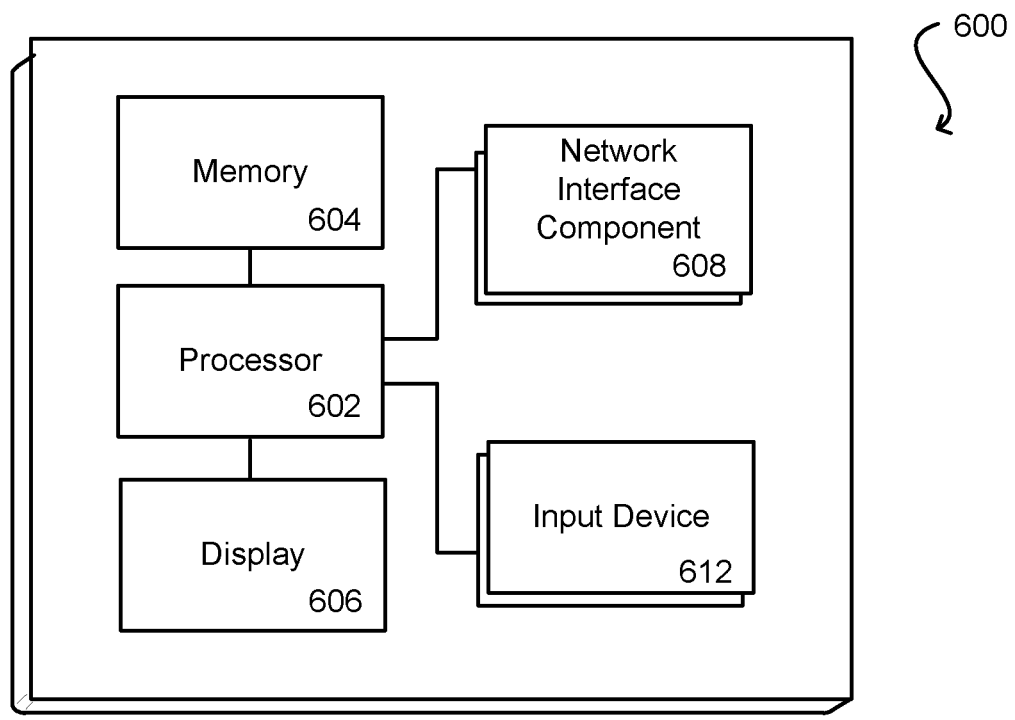
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   receiving, from a client device, a request for media content to be rendered on the client device with a plurality of user-adjustable quality settings for transcoding the media content;
   verifying that the plurality of user-adjustable quality settings for the media content comply with at least one first restriction specified by a content publisher and at least one second restriction specified by a network operator, the at least one first restriction and the at least one second restriction specified through an interface of a service provider and limiting a range of bit rates or resolutions used for transcoding the media content, the at least one second restriction for the plurality of user-adjustable quality settings being specified by the network operator based at least in part on available bandwidth in the network, and wherein the network operator, the content publisher, and the client device are each separate entities;
   receiving an adjustment of the one of the plurality of user-adjustable quality settings for the data content; and
   transcoding the media content from a source format into at least one different format based at least in part on the adjustment of the one of the plurality of user-adjustable quality settings associated with the request to produce at least one transcoded version of the media content.

2. The computer implemented method of claim 1, wherein the at least one first restriction comprises a minimum bit rate or resolution for transcoding the media content and the at least one second restriction comprises a maximum bit rate or resolution for transcoding the media content.

3. The computer implemented method of claim 1, wherein the plurality of user-adjustable quality settings are selected using a graphical user interface displayed on the client device.

4. The computer implemented method of claim 1, wherein transcoding the media content further comprises:
   modifying at least one of a bit rate or a resolution of the media content based at least in part on time-of-day or network traffic congestion in a network over which the media content is provided to the client device.

5. The computer implemented method of claim 1, further comprising:
providing the at least one transcoded version of the media content to the client device in response to the request.

6. The computer implemented method of claim 1, wherein the plurality of user-adjustable quality settings associated with the request are generated by at least one of: a browser on the client device; an application executing on the client device, or an operating system of the client device.

7. The computer implemented method of claim 1, wherein the network operator is enabled to modify the one of the plurality of user-adjustable quality settings to adjust the quality of service associated with the network.

8. A computing system, comprising:
at least one processor; and
memory including instructions that, when executed, cause the computing system to:
receive, from a client device, a request for media content to be rendered on the client device with a plurality of quality settings for transcoding the media content;
verify that the plurality of quality settings for the media content comply with at least one first restriction specified by a content publisher and at least one second restriction specified by a network operator, the at least one first restriction and at least one second restriction specified through an interface of a service provider and limiting a range of bit rates or resolutions used for transcoding the media content, the at least one second restriction for the plurality of quality settings being specified by the network operator based at least in part on available bandwidth in the network, and the client device are each separate entities;
receive an adjustment of the one of the plurality of quality settings for the data content; and
transcode the media content from a source format into at least one different format based at least in part on the adjustment of the one of the plurality of quality settings associated with the request to produce at least one transcoded version of the media content.

9. The computing system of claim 8, wherein the at least one first restriction comprises a minimum bit rate or resolution for transcoding the media content and the at least one second restriction comprises a maximum bit rate or resolution for transcoding the media content.

10. The computing system of claim 8, wherein the plurality of quality settings are selected using a graphical user interface displayed on the client device.

11. The computing system of claim 8, wherein the instructions to transcode the media content further cause the system to:
modify at least one of a bit rate or a resolution of the media content based at least in part on time-of-day or network traffic congestion in a network over which the media content is provided to the client device.

12. The computing system of claim 8, wherein the instructions, when executed, further cause the system to:
provide the at least one transcoded version of the media content to the client device in response to the request.

13. The computing system of claim 8, wherein the plurality of quality settings associated with the request are generated by at least one of: a browser on the client device; an application executing on the client device, or an operating system of the client device.

14. The computing system of claim 8, wherein the network operator is enabled to modify the one of the plurality of quality settings to adjust the quality of service associated with the network.

15. A non-transitory computer readable storage medium storing one or more sequences of instructions executable by one or more processors to perform a set of steps comprising:
receiving, from a client device, a request for media content to be rendered on the client device with a plurality of user-adjustable quality settings for transcoding the media content;
verifying that the plurality of user-adjustable quality settings for the media content comply with at least one first restriction specified by a content publisher and at least one second restriction specified by a network operator, the at least one first restriction and at least one second restriction specified through an interface of a service provider and limiting a range of bit rates or resolutions used for transcoding the media content, the at least one second restriction for the plurality of user-adjustable quality settings being specified by the network operator based at least in part on available bandwidth in the network, and wherein the network operator, the content publisher, and the client device are each separate entities;
receiving an adjustment of the one of the plurality of user-adjustable quality settings for the data content based at least in part on the at least one first restriction and the at least one second restriction; and
transcoding the media content from a source format into at least one different format based at least in part on the adjustment of the one of the plurality of user-adjustable quality settings associated with the request to produce at least one transcoded version of the media content.

16. The non-transitory computer readable storage medium of claim 15, wherein the at least one first restriction comprises a minimum bit rate or resolution for transcoding the media content and the at least one second restriction comprises a maximum bit rate or resolution for transcoding the media content.

17. The non-transitory computer readable storage medium of claim 15, wherein the plurality of user-adjustable quality settings are selected using a graphical user interface displayed on the client device.

18. The non-transitory computer readable storage medium of claim 15, wherein transcoding the media content further comprises:
modifying at least one of a bit rate or a resolution of the media content based at least in part on time-of-day or network traffic congestion in a network over which the media content is provided to the client device.

19. The non-transitory computer readable storage medium of claim 15, further comprising instructions to perform the step of:
providing the at least one transcoded version of the media content to the client device in response to the request.

20. The non-transitory computer readable storage medium of claim 15, wherein the plurality of user-adjustable quality settings associated with the request are generated by at least one of: a browser on the client device; an application executing on the client device, or an operating system of the client device.

* * * * *